(12) United States Patent
Maier

(10) Patent No.: US 6,435,486 B2
(45) Date of Patent: *Aug. 20, 2002

(54) HYDRAULICALLY DAMPING RUBBER SUPPORT

(75) Inventor: Peter Maier, Oeverich (DE)

(73) Assignee: Mannesmann Boge GmbH, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,619

(22) Filed: Oct. 6, 1999

(30) Foreign Application Priority Data

Oct. 6, 1998 (DE) .......................... 198 45 979

(51) Int. Cl.⁷ ................................. F16F 5/00
(52) U.S. Cl. ................................ 267/140.12
(58) Field of Search ............... 267/140.11, 140.12, 267/140.13, 140.1, 140.3, 140.5

(56) References Cited

U.S. PATENT DOCUMENTS

| | | | | |
|---|---|---|---|---|
| 3,387,839 A | * | 6/1968 | Miller et al. ............... 267/282 |
| 3,698,703 A | * | 10/1972 | Hipsher ..................... 267/63 |
| 4,700,935 A | * | 10/1987 | Andra ..................... 267/140.1 |
| 4,768,760 A | * | 9/1988 | Fol ........................ 267/140.12 |
| 4,790,520 A | * | 12/1988 | Tanaka ..................... 267/140.1 |
| 4,840,357 A | * | 6/1989 | Jouade ................... 267/140.12 |
| 4,871,152 A | * | 10/1989 | Funahashi ................ 267/140.1 |
| 5,040,774 A | * | 8/1991 | Veverka .................. 267/140.1 |
| 5,044,813 A | * | 9/1991 | Gregg ................... 267/140.12 |
| 5,060,918 A | * | 10/1991 | Kanda ..................... 267/140.1 |
| 5,172,894 A | * | 12/1992 | Hein ..................... 267/140.12 |
| 5,251,884 A | * | 10/1993 | Bouhier ................. 267/140.12 |
| 5,308,048 A | * | 5/1994 | Weaver ..................... 267/220 |
| 6,036,182 A | * | 3/2000 | Okanaka ................. 267/140.12 |
| 6,199,840 B1 | * | 3/2001 | Yano ..................... 267/140.12 |

* cited by examiner

*Primary Examiner*—Christopher P. Schwartz
(74) *Attorney, Agent, or Firm*—Cohen, Pontani, Lieberman & Pavane

(57) ABSTRACT

A hydraulically damping rubber support comprises an outer tubular part, an inner tubular part arranged within the latter at a distance therefrom, and a first rubber part inserted between them with at least one chamber filled with damping medium. A further tubular component is arranged within the inner tubular part and a second rubber part is arranged between the inner part and the further tubular component.

9 Claims, 2 Drawing Sheets

HYDRAULICALLY DAMPING RUBBER SUPPORT

BACKGROUND OF THE INVENTION

1. Field of the Invention

The invention relates to a hydraulically damping rubber support comprising an inner part, an outer part which is arranged concentrically or eccentrically to the latter at a distance therefrom, and a rubber part arranged between the inner part and the outer part and having at least one chamber filled with damping medium.

2. Description of the Related Art

Prior art rubber supports in which a rubber part is inserted between an inner part and an outer tube arranged at a distance therefrom are disclosed, for example, in German reference DE 196 40 531 A1 with at least one chamber filled with damping medium being arranged in this rubber part. Rubber supports of this kind are used in motor vehicle suspensions where they are intended to damp or decouple noise so that high-frequency vibrations excited by the vehicle's engine are not transmitted to the vehicle suspension. These rubber supports have a low spring rate. Moreover, applications of rubber supports are also known in which the flexible rubber part has a high spring rate to ensure sufficient damping during vehicle braking maneuver. However, the known rubber supports can only be used to solve one of the above-mentioned problems at a time.

SUMMARY OF THE INVENTION

It is the object of the invention to provide a hydraulically damping rubber support which satisfactorily decouples noise and simultaneously has a high spring rate to ensure sufficient damping during vehicle braking maneuvers.

To achieve this object, the rubber support according to the invention includes first and second tubular component with each of the first and second tubular components having a flexible rubber part, forming inner and outer parts which are connected in parallel or in series.

The advantage with this inventive embodiment is that two very different tasks are virtually divided between two distinct rubber supports and that a single overall support is created by nesting the two supports. In this arrangement, the two supports may be connected in parallel or in series, so that after an appropriate deflection of the soft support, the hard support is then subjected to loading.

According to another embodiment example, at least one of the first and second rubber supports is provided with an internal or external stop. The advantages here are that the progression of the brake characteristic may be varied by hard or soft stops in the hard support and that the point at which the hard support comes into action may be determined by the hard or soft stops in the soft support.

In a further embodiment, stop may act in either the radial or the axial direction.

To obtain another damping option in the second support, the further support comprises a chamber filled with damping medium.

Damping or restriction or the provision of a bypass between two chambers filled with damping medium is provided by connecting at least two chambers filled with damping medium via at least one fluid-medium connection.

To match different operating ranges by the first and second rubber supports, provision is made for the rubber support and the further support to be designed with different spring rates.

Further possible variations in the support characteristics may be achieved if rigid and/or flexible stops are provided as stops.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
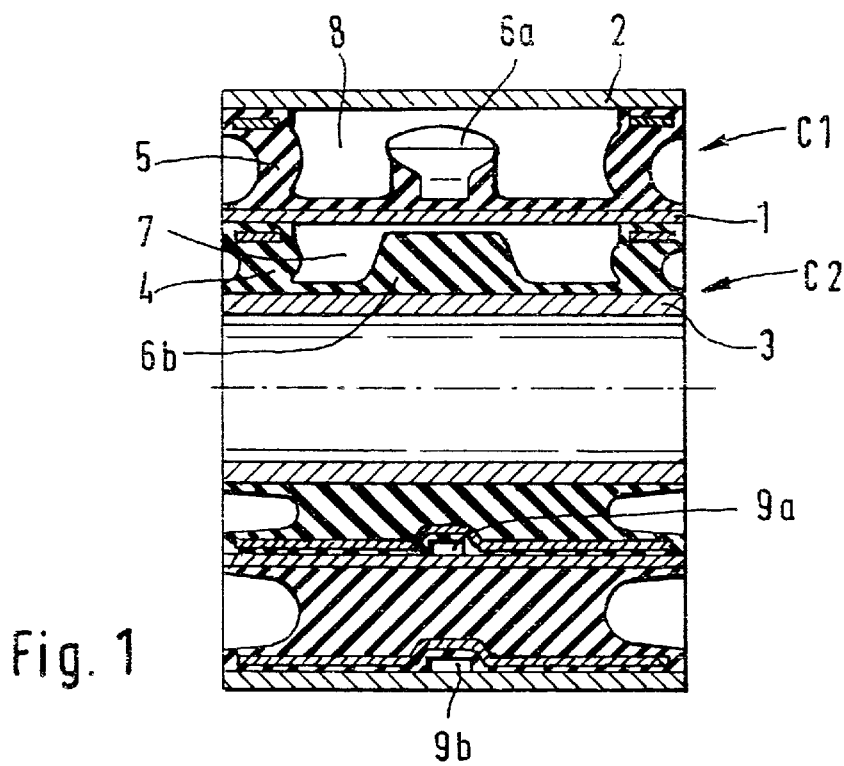
FIG. 1 is a longitudinal sectional view of a rubber support according to an embodiment of the present invention.

A hydraulically damping rubber support 20 according to an embodiment of the present invention is shown in FIG. 1. The hydraulically damping rubber support 20 comprises an inner tubular part 1 and an outer tubular part 2, which is arranged concentrically to the inner part 1 at a distance therefrom. A first rubber part 5 of a first rubber support C1 is inserted between the inner tubular part 1 and the outer tubular part 2 and comprises chambers 8 filled with a damping medium. These chambers 8 are hydraulically connected to one another via flow connections 9b and the first rubber part 5 is firmly connected both to the inner tubular part 1 and to the outer tubular part 2. By way of example, the connection of the first rubber part 5 with the inner tubular part 1 may be made by vulcanization of the first rubber part 5 and the connection of the first rubber part 5 to the outer tubular part 2 may be made by a rigid connection using metal rings 22.

A further tubular component 3 is arranged concentrically within the inner tubular part 1. A second rubber part 4 of a second rubber support C2 is arranged between the inner 1I tubular part 1 and the further tubular component and forms another support. The second rubber part 4, the inner tubular part 1 and the further tubular component 3 define additional chambers 7 filled with damping medium. These additional chambers 7 may also be connected to one another in a restricted or unrestricted manner by a flow connection 9a. When the force acting on the rubber support 20 acts along a radial direction, the first rubber part 5 and second rubber part 4 20 are connected in series relative to the direction of the force. When the force acting on the rubber support acts along a longitudinal direction, the first rubber part 5 and second rubber part 4 are connected in parallel relative to the direction of the force.

The second rubber part 4 has a different Shore hardness than the first rubber part 5, each of which is matched to a respective operating condition. These first and second rubber parts 5, 4 may thus be used for damping in a very wide variety of operating ranges. Regarding noise, a good decoupling should be provided and this requires a low spring rate. Regarding vehicle braking operation, the other rubber part should have a high spring rate to give appropriate damping. Therefore, one of the first and second rubber parts 5, 4 has a low spring rate while the other of the first and second rubber parts 5, 4 has a high spring rate.

The hydraulically damping rubber support 20 includes a stop 6a which rests against the inner circumference of the outer tubular part 2 during radial loading. Assuming that the first rubber part 5 has a low spring rate, the second support becomes active only when the stop 6a is resting against the inner wall of the outer tubular part 2. The second rubber part 4 is now loaded at the high spring rate and damps vibrations from different operating ranges.

The damping-medium-filled chamber 7 of the second rubber support 4 also includes a stop 6b so that the inner wall of the inner tubular part 1 rests against the stop 6b at the appropriate loading.

Figure 2:
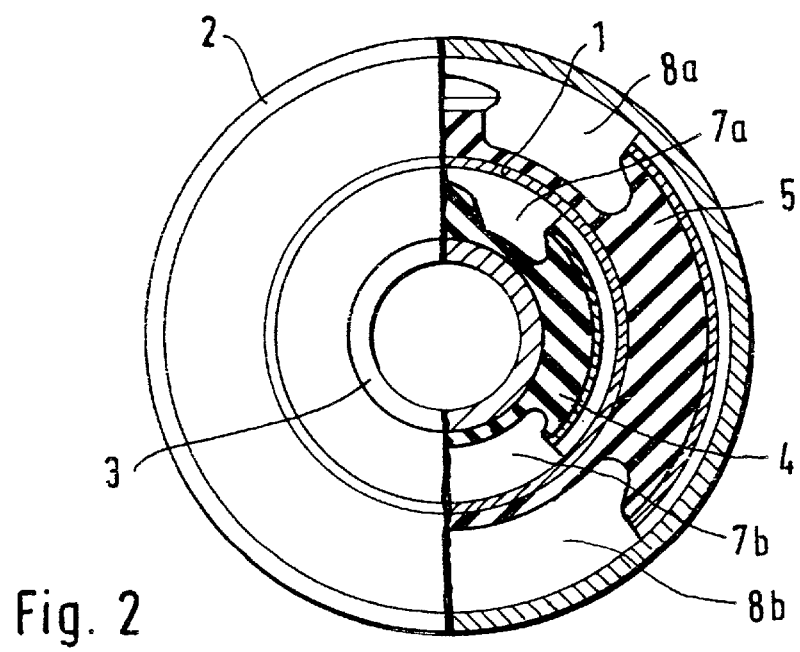
FIG. 2 is a partial section front view of the rubber support of FIG. 1.

FIG. 2 provides a front view of the rubber support 20 of FIG. 1. The chambers 7 and 8 can be seen with flow connections 9a and 9b. The inner tubular part 1, the outer tubular part 2 and the tubular component 3 are provided with first and second rubber parts 5, 4 inserted between them.

Figure 3:
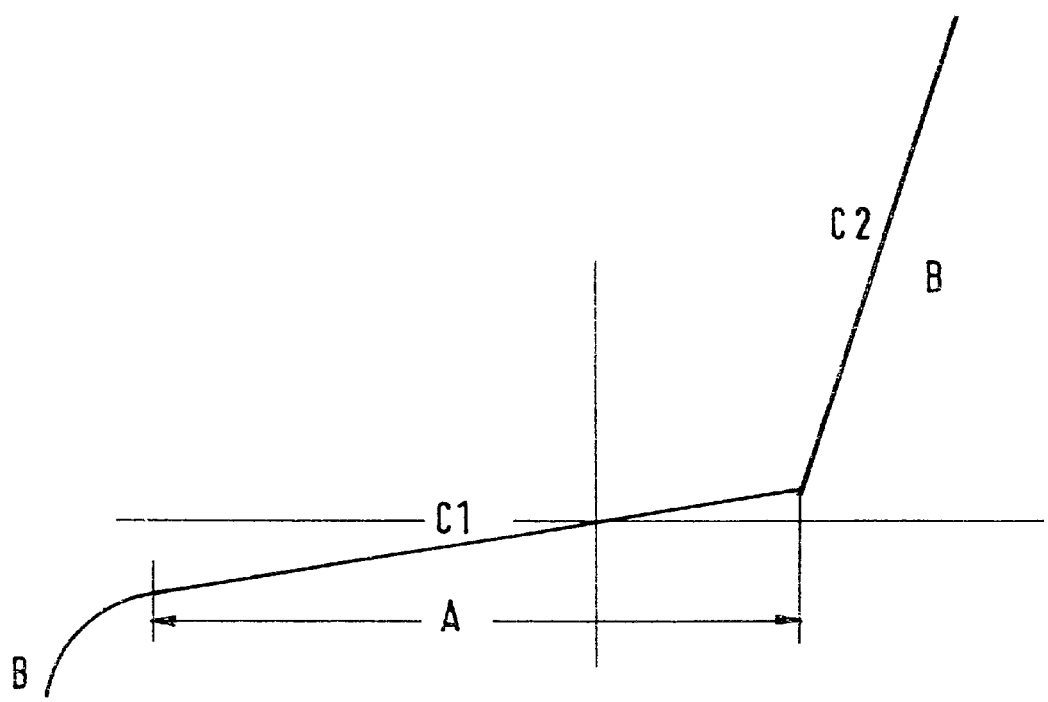
FIG. 3 is a graph depicting a damping-force characteristic of the rubber support of FIG. 1.

FIG. 3 is a graphic depiction of the radial deflection on the horizontal axis and the force on the vertical axis. Range A is assigned to the hydraulic damping of the first rubber support C1 while range B is assigned to the hydraulic damping of the second rubber support C2 which becomes active when the stop 6a strikes the outer tubular part 2.

Figure 4:
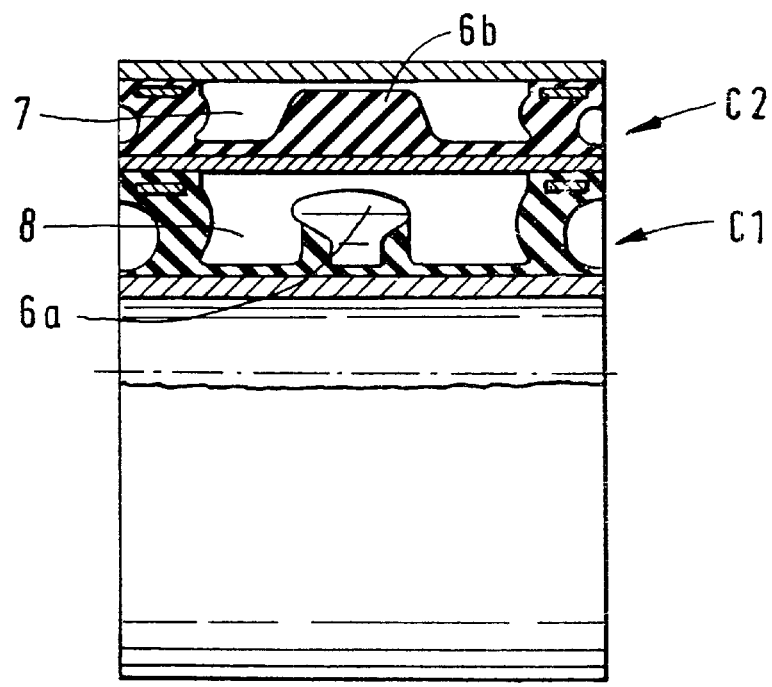
FIG. 4 is a partial longitudinal sectional view of another embodiment of the rubber support according to the invention.

FIG. 4 shows another embodiment of a rubber support 20', in which a first support C1' is arranged on the inside and a second support C2' is arranged on the outside. In the embodiment, the inner support comprises the first rubber part 5 with the low spring rate. The arrangement of the chambers 7 and 8 filled with damping medium is thus reversed accordingly.

The invention is not limited by the embodiments described above which are presented as examples only but can be modified in various ways within the scope of protection AL defined by the appended patent claims.

I claim:

1. A hydraulically damping rubber support, comprising:
   an inner tubular part;
   an outer part arranged over said inner tubular part at a radial distance therefrom;
   a first rubber part having a chamber filled with a hydraulic damping medium inserted between said inner tubular part and said outer part and forming a first rubber support, wherein said first rubber part is arranged such that said first rubber support is hydraulically damped;
   a further tubular component arranged within said inner tubular part;
   a second rubber part having a chamber filled with a hydraulic damping medium and inserted between said inner tubular part and said further tubular part and forming a second rubber support, wherein said second rubber part is arranged such that said second rubber support is hydraulically damped, said first rubber support being separated from said second rubber support by said inner tubular part such that said first and second rubber supports act independently, one of said first and second rubber supports comprising a soft rubber support and the other of said first and second rubber supports comprising a hard rubber support, said soft rubber support and said hard rubber support being arranged in series such that said soft rubber support is deflected by an initial deflection before said hard rubber support is active in response to a load applied to said rubber support.

2. The rubber support of claim 1, wherein said one of said first and second rubber supports comprises a stop for limiting a deflection of said one of said first and second rubber support, wherein said stop limits the deflection of said one of said-first and second rubber supports after the initial deflection.

3. The rubber support of claim 2, wherein said stop acts in one of a radial and an axial direction.

4. The rubber support of claim 3, wherein said stop comprises a rigid stop.

5. The rubber support of claim 3, wherein said stop comprises a flexible top.

6. The rubber support of claim 1, wherein said chamber of said second rubber part comprises two chambers connected via a fluid medium connection.

7. The rubber support of claim 1, wherein said first rubber support comprises a first spring rate and said second rubber support comprises a second spring rate and said first spring rate is different from said second spring rate.

8. The rubber support of claim 1, wherein said chamber of said first rubber part comprises two chambers connected via a fluid-medium connection.

9. The rubber support of claim 1, wherein said s econd rubber part is connected in series with said first rubber part.

* * * * *